United States Patent
Giggenbacher et al.

(10) Patent No.: US 7,427,071 B2
(45) Date of Patent: Sep. 23, 2008

(54) DIVIDED DRIVER DEVICE FOR A SLIP RING SEAL

(75) Inventors: Markus Giggenbacher, Münsing (DE); Günther Lederer, Geretsried (DE); Dieter Pfeil, Eurasburg (DE); Michael Riedl, Berg (DE); Jörg Thelke, Wolfratshausen (DE)

(73) Assignee: Burgmann Industries GmbH & Co. KG, Wolfratshausen (DE)

( * ) Notice: Subject to any disclaimer, the term of this patent is extended or adjusted under 35 U.S.C. 154(b) by 83 days.

(21) Appl. No.: 10/524,917

(22) PCT Filed: Aug. 1, 2003

(86) PCT No.: PCT/EP03/08522

§ 371 (c)(1), (2), (4) Date: Aug. 29, 2005

(87) PCT Pub. No.: WO2004/027294

PCT Pub. Date: Apr. 1, 2004

(65) Prior Publication Data

US 2006/0097456 A1    May 11, 2006

(30) Foreign Application Priority Data

Aug. 21, 2002    (DE) .............................. 202 12 847 U

(51) Int. Cl.
 *F16J 15/34* (2006.01)
(52) U.S. Cl. ........................ 277/370; 277/372; 277/373; 277/374; 277/375
(58) Field of Classification Search .......... 277/370–375
See application file for complete search history.

(56) References Cited

U.S. PATENT DOCUMENTS 3,025,070 A * 3/1962 Copes ......................... 277/370
5,354,070 A * 10/1994 Carmody .................... 277/370

(Continued)

FOREIGN PATENT DOCUMENTS

DE    24 10 968 B1    6/1975

(Continued)

*Primary Examiner*—Vishal Patel
(74) *Attorney, Agent, or Firm*—Scott D. Wofsy; Edwards Angell Palmer & Dodge LLP

(57) ABSTRACT

A divided driver device (5) for a mechanical face seal for non-rotatable assembly on a rotary component and for the transmission of a torque to a seal ring (2) held in non-rotatable manner on the driver device. The driver device (5) is divided in at least a single radial plane so as to form sections in the form of segments of a circle that are adapted to be clamped together to form a ring shape and furthermore, it is axially sub-divided into a divided retaining ring (14) for retaining the seal ring (2) and a divided mounting ring (16) for non-rotatable mounting to the rotary component. The rings (14, 16) are coupled together for rotation in common, as indicted by (24). The retaining ring (14) comprises mutually sealed sections ($14_1$, $14_2$) in the form of segments of a circle which are adapted to be placed together to form a ring shape having an inner radial dimension that is greater than the nominal outer radial dimension of the rotary component concerned (6), and said sections comprise peripherally aligned end faces ($15_1$, $15_2$) which are preferably in metal-to-metal contact with one another and have a surface finish for mutually sealing them.

6 Claims, 2 Drawing Sheets

U.S. PATENT DOCUMENTS

Figure 1:
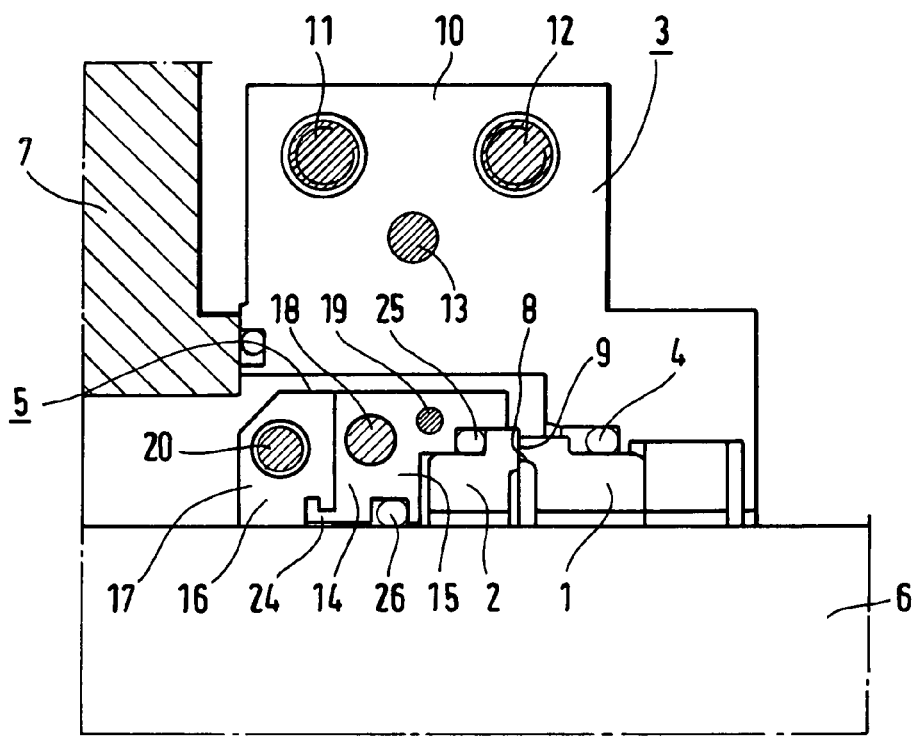

| | | | |
|---|---|---|---|
| 5,490,682 A * | 2/1996 | Radosav et al. | 277/370 |
| 5,725,220 A | 3/1998 | Clark et al. | |
| 5,938,205 A * | 8/1999 | Azibert et al. | 277/361 |
| 6,076,832 A | 6/2000 | Pow | |
| 6,758,476 B2 * | 7/2004 | Takahashi | 277/370 |
| 2003/0102631 A1 * | 6/2003 | Takahashi | 277/370 |

FOREIGN PATENT DOCUMENTS

| | | |
|---|---|---|
| DE | 26 40 687 A1 | 6/1977 |
| DE | 28 05 504 A1 | 8/1978 |
| DE | 35 87 779 T2 | 10/1994 |
| EP | 0 658 713 A1 | 12/1994 |
| GB | 2 361 966 A | 5/2001 |
| JP | 08054067 A * | 2/1996 |

* cited by examiner

DIVIDED DRIVER DEVICE FOR A SLIP RING SEAL

The invention relates to a divided driver device for a mechanical face seal in accordance with the preamble of claim 1. Furthermore, it relates to a mechanical face seal equipped with such a driver device.

In the case of mechanical face seals, the driver devices serve the purpose of holding the rotary seal ring on the one hand and producing a non-rotatable connection between the seal ring and a rotary component e.g. a shaft on the other. Due to wear or as a result of other circumstances, replacement of the seal rings may become necessary in the course of the operational period of a mechanical face seal. In the case of mechanical face seals located in poorly accessible positions of an equipment, such replacement can be difficult or impossible thereby it may be necessary to simultaneously dismantle other constructional parts of the equipment. Consequently, proposals have already been made for divided mechanical face seals having divided driver devices which can be mounted on and dismantled from a shaft without previously having to provide free accessibility to the assembly location. In addition, divided mechanical face seals are frequently used for shafts of large diameter e.g. ships propeller shafts, rolling mill shafts etc. where divided mechanical face seals provide an assembly-advantage in comparison with undivided ones. A divided mechanical face seal incorporating a divided driver device which has a seal ring at one axial end and means for clamping it to a shaft at the other end is known (GB-A-2361966). However, even when the arrangement is assembled carefully, one cannot exclude the possibility of this clamping-type connection of the driver device to the shaft leading to distortions of the ring segments which can have effects on the exact positioning of the seal ring concerned. Additionally it proves to be problematic to hold the ring halves in a sufficiently close mutual sealing relationship unless auxiliary sealing means such as gaskets or the like are provided. The assembly process is always complex and requires special care.

An object of the invention is to provide a divided driver device for a mechanical face seal of the type mentioned above, which can be mounted on and dismantled from a rotary component in problem-free manner and which, at the same time, ensures precise positioning of the seal ring. Furthermore, the driver device should enable sealing between those ring halves whereat sealing is required, without the need for auxiliary sealing means.

In accordance with the invention, this object is achieved by the features mentioned in the characterising part of claim 1. One feature of the driver device in accordance with the invention is the axial partitioning thereof into a retaining ring and a mounting ring which are basically mutually independent but nevertheless have a torque-transferring relationship with respect to one another. The retaining ring serves for supporting the seal ring, whereas the mounting ring undertakes the task of producing the non-rotatable torque-transferring connection to the shaft. Both of the rings themselves are radially divided into at least two respective ring halves which can be clamped together after being arranged around the shaft. The retaining ring is loosely seated around the shaft with radial play and, in contrast to the mounting ring, is not subjected to mounting forces. The retaining ring can therefore assume a (possibly self-) centred position with respect to the shaft thereby creating optimal conditions for the operation of the seal ring disposed on the retaining ring. Moreover, the invention enables advantageous mutual sealing of the ring halves of the retaining ring by virtue of a metal-to-metal contact between the end faces of the ring halves, i.e. without the provision of auxiliary sealing means. By virtue of these measures, the assembly of the driver device can be rapidly accomplished with comparatively little effort even by less skilled personnel since no special care needs to be taken in regard to the exact positioning of the mounting ring on the shaft, whilst the desired location, the sealing function and the formation of the retaining ring result quasi automatically if the relevant locking screws are installed using a suitable tightening moment. Furthermore, in many cases, only the retaining ring needs to be dismantled and replaced, while the mounting ring can remain in place. The driver device in accordance with the invention is therefore characterised by its especial assembly-friendliness together with a simultaneous improvement in its operational behaviour. In regard to other aspects of the invention, reference should be made to the claims.

Figure 2:
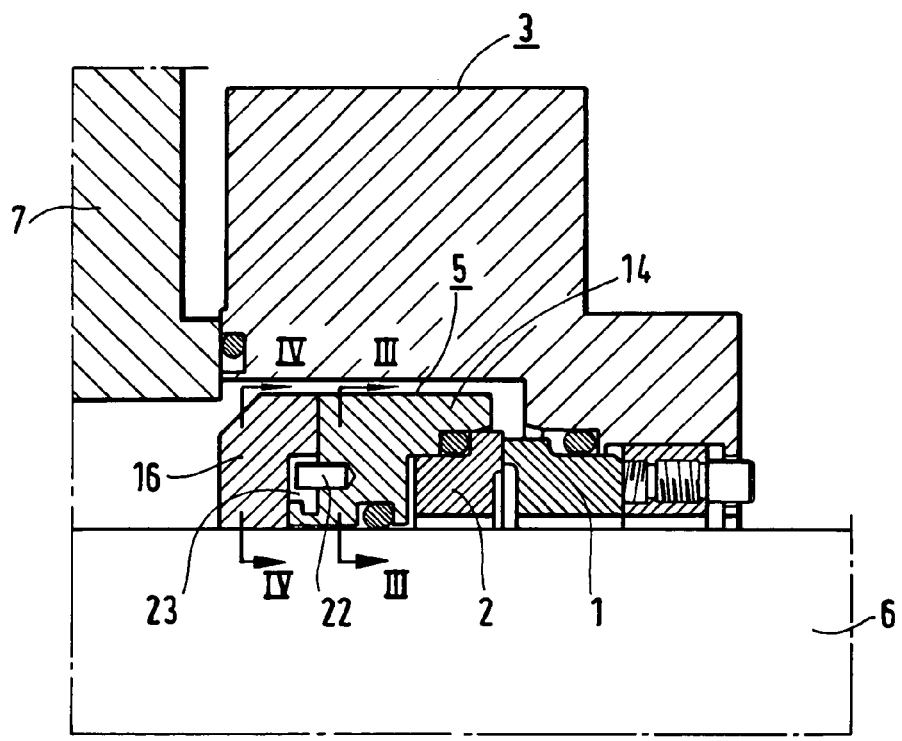
Figure 3:
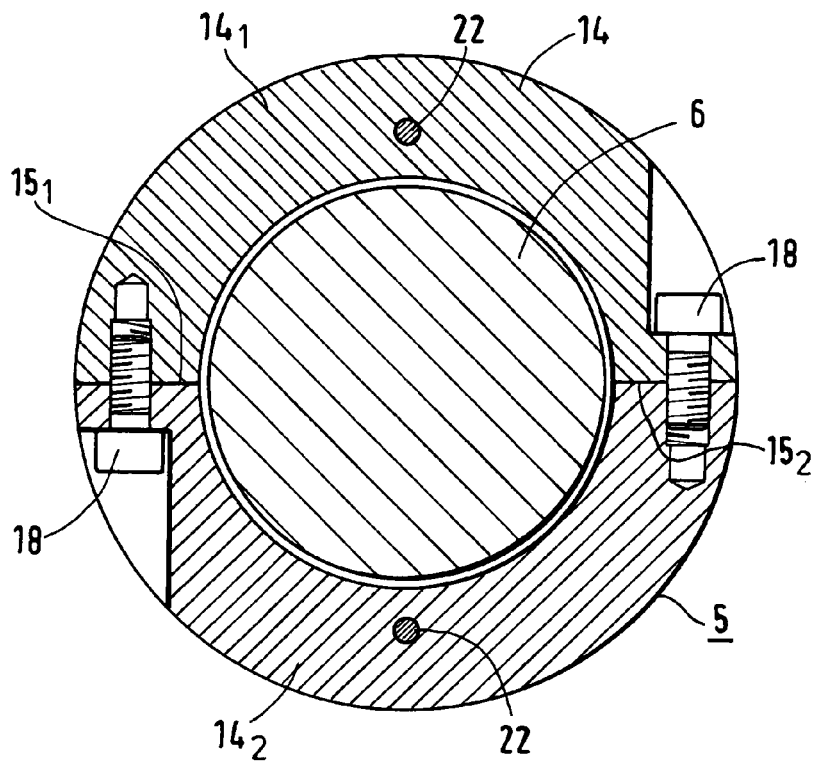
Figure 4:
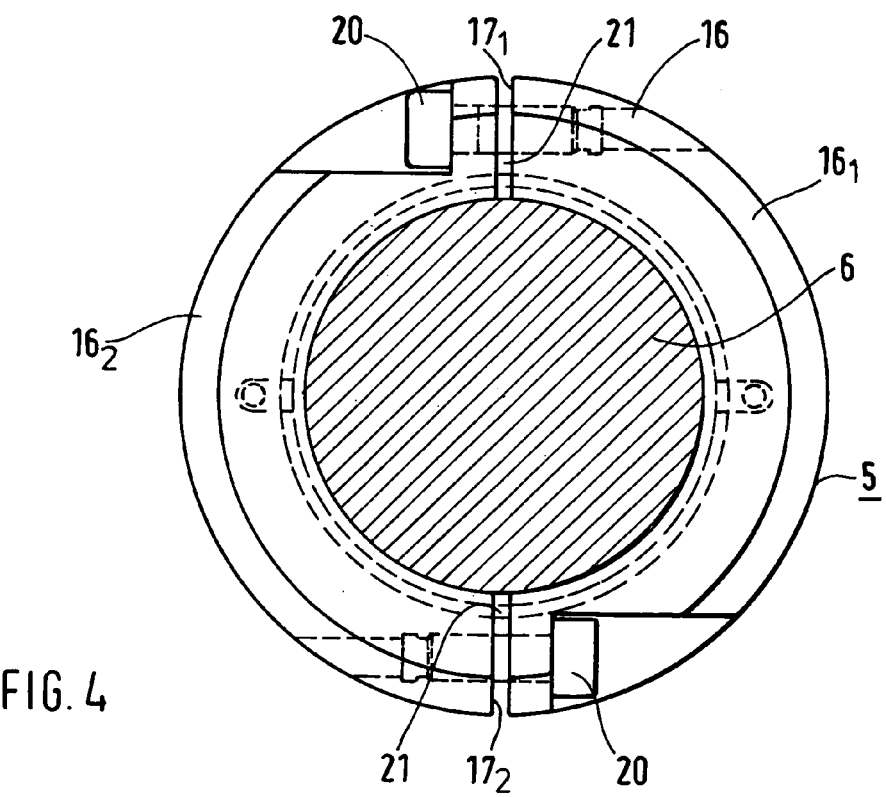

The invention will be explained in more detail hereinafter on the basis of an embodiment and the drawing. Therein:

FIG. 1 is a view in the dividing plane of a mechanical face seal of the divided type including a divided driver device in accordance with the invention, FIG. 2 is a longitudinal-sectional view taken along a sectional plane which does not coincide with the dividing plane of FIG. 1, showing the mechanical face seal of the divided type including a divided driver device, FIG. 3 is a sectional view along the sectional plane III-III in FIG. 2, and FIG. 4 is a sectional view along the section line IV-IV in FIG. 2.

Although the invention is described hereinafter in connection with a mechanical face seal wherein not only the driver device in accordance with the invention but also the parts forming the stationary part of the mechanical face seal are divided in a radial plane, the application of the invention is not restricted to a divided mechanical face seal. Rathermore, the divided drive device in accordance with the invention can also offer advantages in the case of a mechanical face seal wherein the stationary part is not divided and can be axially displaced on a shaft in order to expose the drive means for the purposes of assembling and disassembling the divided driver device.

The basic construction of a mechanical face seal is known to the skilled person. It is therefore sufficient here to indicate that the mechanical face seal comprises a pair of cooperating seal rings 1, 2, of which one, namely the seal ring 1, is held in non-rotatable manner but nevertheless axially displaceable with respect to a seal housing 3 and is sealed with respect thereto by a secondary seal 4 which may be an O-ring. The other seal ring 2 is firmly connected by a driver device bearing the general reference number 5 to a shaft 6 so that the seal ring 2 can rotate together with the shaft 6. Furthermore, the housing of an equipment, e.g. a pump or a compressor whose interior is to be sealed with respect to the external environment by means of the mechanical face seal is indicated by the reference number 7 in the drawing.

The seal rings 1, 2 have oppositely located cooperating seal faces 8, 9 between which a sealing gap is formed in operation in order to seal a zone located peripherally outwardly of the sealing gap with respect to a zone located peripherally inwardly thereof. The seal faces 8, 9 can also make contact with one another in sealing engagement when operational. A biasing means (not shown) is provided in order to apply an axial bias force to one of the seal rings 1, 2, preferably the stationary seal ring 1, so as to bias the seal faces 8, 9 of the seal rings 1, 2 together.

The mechanical face seal is divided in a radial plane through the central longitudinal axis thereof. The aforementioned constructional parts of the mechanical face seal are therefore divided into semicircular segments. The respective end faces of one of the particular semicircular segments or ring halves of the constructional parts on one side of the central longitudinal axis are illustrated in the drawing, whereby the associated end faces on the opposite side of the central longitudinal axis are omitted for the purposes of simplifying the graphic illustration.

The end face of the seal housing 3 bears the reference number 10 and is mechanically worked in such a way that a sealing relationship between the superimposed end faces 10 of the two ring halves of the seal housing 3 will occur without the need for further auxiliary sealing means if they are each clamped firmly together by means of a pair of locking screws 11, 12 at diametrically opposite sides of the seal housing 3 whereby the adjoining end faces 10 rest upon one another in the form of a planar metal-on-metal contact. The requisite mechanical finishing process needed for achieving adequate sealing engagement of the end faces 10 is in principle known to the skilled person so that a more detailed explanation in regard thereto is unnecessary.

EXAMPLE

It has been established that an adequate sealing relationship between the end faces 10 of a mechanical face seal which is designed for a shaft 6 having a nominal diameter of 50 mm is obtained if the size M8 locking screws 11, 12 are tightened using a torque of approximately 14 Nm and the planarity discrepancy of the superimposed end faces 10 amounts to no more than 5 μm and the roughness $R_a$ of the end faces is $\leq 1$ μm.

For the purposes of mutually aligning the opposite end faces 10, there may be provided a positioning pin 13 which projects from each of the end faces and can engage in an aligned boring in the opposite end face of the other ring half.

In accordance with the invention, the drive device is axially sub-divided into a retaining ring 14 and a mounting ring 16. Each of these rings 14, 16 themselves is then divided along a radial plane, in a similar manner to the seal housing 3, into semicircular segments or ring halves having respective peripherally aligned end faces 15 and 17 which face each other in the operative position.

FIG. 3 shows the retaining ring 14 consisting of the ring halves $14_1$, $14_2$ and the respective end faces $15_1$, $15_2$ in the assembled state. In the operative state, the end faces $15_1$ and $15_2$ lie flatly on top of one another without separate sealing means being provided therebetween. For this purpose, the end faces $15_1$ and $15_2$ are mechanically finished in a manner such as was previously described in connection with the seal housing 3. The ring halves $14_1$, $14_2$ can be firmly clamped together by means of a pair of locking screws 18 which are provided at diametrically opposite positions and are inserted into tangentially aligned borings that are formed in the ring halves close to the outer peripheries thereof. One or more positioning pins 19 similar to the pin 13 can be provided in order to locate and then hold the end faces $15_1$, $15_2$ in a desired mutually aligned relationship.

As is shown in FIG. 3, the retaining ring 14 surrounds the shaft 6 with a small amount of radial play as the internal diameter of the retaining ring 14 is somewhat greater than the external diameter of the shaft 6 in the mounted state. As a result thereof, the planar seating of the end faces $15_1$, $15_2$ is not impaired by the assembly of the retaining ring 14 on the shaft 6 as would be the case for example if a fixed engagement between the retaining ring 14 and the shaft 6 were used.

The mounting ring 16 is shown in more detail in FIG. 4 and comprises a pair of semicircular or virtually semicircular segments or ring halves $16_1$, $16_2$ having oppositely located, peripherally aligned end faces $17_1$, $17_2$. As illustrated, the ring halves $16_1$, $16_2$ can be clamped together by means of a pair of diametrically opposed locking screws 20 in a manner similar to that described in connection with the retaining ring 14. However, other than was the case for the retaining ring 14, the radial dimensions at the inner periphery of the ring halves $16_1$, $16_2$ are such that the mounting ring 16 can engage the outer periphery of the shaft 6 in a firmly clamped manner. This can be achieved by making the internal diameter of the mounting ring 16 smaller to a certain extent than the external diameter of the shaft 6 when the end faces $17_1$, $17_2$ lie flatly upon one another. Thus, when the mounting ring 16 is arranged on the shaft 6 and after the ring halves $16_1$, $16_2$ have been clamped, there remains a gap 21 between the end faces $17_1$, $17_2$ as the ring halves $16_1$, $16_2$ firmly embrace the shaft 6 in the manner of a pipe clamp in order to create a firm clamping relationship between the mounting ring 16 and the shaft 6 so that the mounting ring 16 and the shaft 6 are compelled to rotate together.

Instead of a pair locking screws 20, just one such screw could also be provided at one side, this then operating in conjunction with a hinged joint between the ring halves $16_1$, $16_2$ at the opposite side. Finally, the invention is not restricted to a non-rotatable connection between the mounting ring 16 and the shaft 6 by means of ring halves $16_1$, $16_2$ that surround it in clamped manner. The mounting ring 16 could also be positioned non-rotatably with respect to the shaft 6 in some other way, e.g. by means of set screws which press an axial portion of the mounting ring against the shaft.

Furthermore, the retaining ring 14 and the mounting ring 16 are in the form of a torque-transferring connection so that rotation of the mounting ring 16 causes an identical rotation of the retaining ring 14. For this purpose, one or more peripherally distributed drive pins 22 can be provided in one of the rings 14, 16, on the retaining ring 14 in the present embodiment, whereby said pins can project axially from an axial end face of the retaining ring 14 and engage, with play, in recesses 23 in the adjacent axial end face of the mounting ring 16 that are axially aligned therewith. Moreover, the two rings 14, 16 are held together axially in the manner of a claw clutch, as is indicated by 24 in FIG. 1. It is important that the axial and peripheral connections between the rings 14, 16 are effected in a loosely seated manner so that distortions of the mounting ring 16 that could be caused during the process of mounting it on the shaft 6 cannot be transferred to the retaining ring 14. A sealing relationship between the mutually facing axial end faces of the rings 14, 16 is not necessary.

The rotary seal ring 2 should likewise be mounted such that it is loosely seated in the retaining ring 14. A divisible secondary seal 25, in the form of a divisible O-ring for example, can be provided between the seal ring 2 and the retaining ring 14. A further divisible secondary seal 26, which may likewise be in the form of a divisible O-ring, is provided between the inner periphery of the retaining ring 14 and the outer periphery of the shaft 6 in order to seal the above-mentioned small gap existing therebetween.

Although in the aforementioned embodiment of the invention a division of the driver device in only one radial plane is envisaged so that the mounting ring and the retaining ring are each divided in half, a division in several radial planes may also be effected if so desired so that more than two sections in the form of segments of a circle will be formed. The seal rings preferably consist of brittle materials, such as ceramic materials, silicon carbide, graphite and thus can easily be divided by breaking. A sufficiently sealed jointing of the seal rings will be obtained after they are put back together again at the break points. Finally, the invention also offers advantages if the sealing effect between the superimposed end faces of the ring halves of the retaining ring is produced in a manner other than by a process of finishing the surfaces thereof, e.g. if thin, sealing, flexible coatings are provided on the end faces. Due to the measures in accordance with the invention, distortions of the mounting ring will not have any effect on the retaining ring and thus on the position of the seal ring so that the latter can adopt and maintain a given desired position relative to the stationary seal ring during the operation of the arrangement.

The invention claimed is:

1. A divided driver device for a mechanical face seal for mounting to a rotary component and for the transmission of a torque from the rotary component to a seal ring fastened to the driver device, said driver device being divided in at least a single radial plane for forming sections in the form of segments of a circle, said sections being adapted to be clamped together in the shape of a ring, and said driver device being axially sub-divided into a radially divided retaining ring for retaining the seal ring and a radially divided mounting ring for mounting to the rotary component, said mounting ring and retaining ring being coupled together for rotation in common, wherein said retaining ring includes sections in the form of segments of a circle adapted to be placed together in a sealed manner in the shape of a ring having an inner radial dimension that is greater than the nominal outer radial dimension of the rotary component and further including peripherally aligned end faces abutting each other, and said mounting ring including at least a pair of sections in the form of segments of a circle, said sections being adapted to be combined into a ring having an inner radial dimension that is smaller than that of the retaining ring and smaller than the nominal outer radial dimension of the rotary component for clamping engagement of the mounting ring with the rotary component, wherein the retaining ring and the mounting ring are coupled together with play in at least the circumferential direction by at least one drive pin projecting axially from an axial end face of one of the mounting and retaining rings and engaging, in a loosely seated manner, in a recess defined in an adjacent end face of the other of the mounting and retaining rings, the retaining ring and the mounting ring being axially engaged together to form a claw clutch, wherein the claw clutch is interrupted by the recess engaged with the at least one drive pin.

2. The driver device according to claim 1, wherein said peripherally aligned end faces of the retaining ring are in essentially planar metal-to-metal contact and comprise a surface finish for mutually sealing them.

3. The driver device according to claim 2, wherein said peripherally aligned end faces of the retaining ring have a roughness ≦1.0 μm, preferably ≦0.8 μm, and most preferably 0.5 μm.

4. The driver device according to claim 1, wherein the seal ring is loosely seated on the retaining ring.

5. A divided mechanical face seal comprising:
a) first and second cooperating seal rings;
b) a divided driver device configured for mounting to a rotary component and for the transmission of a torque from the rotary component to the first seal ring, which is adapted to be fastened to the driver device, said driver device being divided in at least a single radial plane for forming sections in the form of segments of a circle, said sections being adapted to be clamped into the shape of a ring, and said driver device being axially sub-divided into a radially divided retaining ring for retaining the first seal ring and a radially divided mounting ring for mounting to the rotary component, said mounting ring and retaining ring being adapted to be coupled together for rotation in common, wherein said retaining ring includes sections in the form of segments of a circle adapted to be placed together in a sealed manner into the shape of a ring having an inner radial dimension that is greater than the nominal outer radial dimension of the rotary component and further including peripherally aligned end faces abutting each other, and said mounting ring including at least a pair of sections in the form of segments of a circle, said sections being adapted to be combined into a ring having an inner radial dimension that is smaller than that of the retaining ring and smaller than the nominal outer radial dimension of the rotary component for clamping engagement of the mounting ring with the rotary component, wherein the retaining ring and the mounting ring are coupled together with play in at least the circumferential direction by at least one drive pin projecting axially from an axial end face of one of the mounting and retaining rings and engaging, in a loosely seated manner, in a recess defined in an adjacent end face of the other of the mounting and retaining rings, the retaining ring and the mounting ring being axially engaged together to form a claw clutch, wherein the claw clutch is interrupted by the recess engaged with the at least one drive pin; and
c) a seal housing divided in at least one radial plane into sections in the form of segments of a circle adapted to be clamped together and mutually sealed against each other, wherein the second seal ring is adapted to be fastened to said housing for cooperating with the first seal ring of the driver device.

6. The mechanical face seal according to claim 5, wherein said sections of the seal housing include peripherally aligned end faces which are configured to be in essentially planar metal-to-metal contact, said end faces having a surface finish for sealing engagement to one another.

* * * * *